(12) United States Patent
Palmer

(10) Patent No.: US 8,397,764 B2
(45) Date of Patent: Mar. 19, 2013

(54) SAFETY CAP FOR COUPLINGS AND FITTINGS

(75) Inventor: David Palmer, San Diego, CA (US)

(73) Assignee: Parrish Enterprises, Ltd., Enid, OK (US)

(*) Notice: Subject to any disclaimer, the term of this patent is extended or adjusted under 35 U.S.C. 154(b) by 694 days.

(21) Appl. No.: 12/539,547

(22) Filed: Aug. 11, 2009

(65) Prior Publication Data
US 2010/0037970 A1 Feb. 18, 2010

Related U.S. Application Data

(60) Provisional application No. 61/088,041, filed on Aug. 12, 2008.

(51) Int. Cl.
F16L 55/10 (2006.01)

(52) U.S. Cl. .......... 138/89; 138/90; 220/234; 220/212.5

(58) Field of Classification Search .............. 138/89, 138/96 R, 96 T
See application file for complete search history.

(56) References Cited

U.S. PATENT DOCUMENTS

| | | | |
|---|---|---|---|
| 554,666 A | 2/1896 | Feltner | |
| 923,545 A | 6/1909 | Madison | |
| 1,712,232 A | 5/1929 | Rothfus | |
| 2,003,460 A | 6/1935 | Paull | |
| 2,665,028 A | 1/1954 | Hintz | |
| 2,667,139 A * | 1/1954 | Campbell | 269/48.1 |
| 3,302,664 A * | 2/1967 | Plamann | 138/89 |
| 3,314,698 A | 4/1967 | Owens | |
| 3,394,836 A * | 7/1968 | Millard | 220/210 |
| 3,439,942 A | 4/1969 | Moore et al. | |
| 3,476,154 A | 11/1969 | Ludeman | |
| 3,633,948 A | 1/1972 | Dickey | |
| 3,672,403 A | 6/1972 | Wilson et al. | |
| 3,814,135 A * | 6/1974 | Hetzer et al. | 138/89 |
| 3,949,787 A * | 4/1976 | Milo | 138/89 |
| 4,014,367 A * | 3/1977 | Milo | 138/89 |
| 4,059,296 A | 11/1977 | Panourgias | |
| 4,222,593 A | 9/1980 | Lauffenburger | |
| 4,351,446 A | 9/1982 | Madden | |
| 4,802,694 A | 2/1989 | Vargo | |
| 4,848,458 A * | 7/1989 | Holdsworth et al. | 166/92.1 |
| 5,005,876 A | 4/1991 | Fahl | |
| 5,224,515 A * | 7/1993 | Foster et al. | 138/89 |
| 5,368,343 A | 11/1994 | Allen | |
| 5,927,760 A | 7/1999 | Rocha | |
| 6,412,827 B1 | 7/2002 | Barclay et al. | |
| 6,508,274 B2 * | 1/2003 | Street | 138/89 |
| 6,834,770 B2 * | 12/2004 | Lo | 220/212.5 |
| 7,134,454 B2 | 11/2006 | Montminy | |
| 7,644,734 B2 | 1/2010 | Palmer | |
| 7,878,220 B2 * | 2/2011 | Fierst et al. | 138/89 |
| 2005/0285400 A1 * | 12/2005 | Feith | 285/901 |
| 2006/0001264 A1 * | 1/2006 | Brass et al. | 285/901 |
| 2010/0163131 A1 * | 7/2010 | Fehr et al. | 138/89 |
| 2010/0301044 A1 * | 12/2010 | Sprecher | 220/210 |

* cited by examiner

Primary Examiner — Patrick F Brinson
(74) Attorney, Agent, or Firm — Dunlap Codding, P.C.

(57) ABSTRACT

A system for protecting the end fittings of a fluid transport hose includes first and second protective caps for respectively engaging with first and second end fittings of the hose. Both the first and second protective caps include a disk that is oriented perpendicular to the hose axis when the cap is engaged with the respective end fitting. Importantly, the disk has a diameter $D_D$ that is greater than the diameter $D_H$ of the hose so the disk will extend radially outward from the hose to thereby protect the end fitting.

20 Claims, 5 Drawing Sheets

SAFETY CAP FOR COUPLINGS AND FITTINGS

This application claims the benefit of U.S. Provisional Patent Application Ser. No. 61/088,041 filed Aug. 12, 2008.

FIELD OF THE INVENTION

The present invention pertains generally to caps for protecting the end fittings of a fluid transport hose. More particularly, the present invention pertains to protective caps that can be selectively engaged with the end fitting of a fluid transport hose to prevent damage to the end fitting during set-up and operational use of the hose. The present invention is particularly, but not exclusively, useful as a system of protective caps which are formed with disk extensions that protrude radially from the axis of a fluid transport hose to absorb incidental impact forces that could otherwise damage the end fitting. It should also be appreciated by one of ordinary skill in the art that the present invention can also be used for hoses used to convey any bulk commodity including: pneumatic conveyance, vacuum conveyance, and septic systems. Furthermore, one of ordinary skill in the art would understand that the present invention can be used in all industrial applications, not just those involving truck transportation. For example, the present invention can also be used in chemical facilities, refineries, rail yards, aviation facilities, and in the movement of material from an offshore vessel to an onshore facility.

BACKGROUND OF THE INVENTION

Damage to the end fittings of a fluid transport hose is not an insignificant problem. Indeed, in many operational environments, such damage can be very detrimental. This is so for several reasons. For one, fluid transport hoses are used almost exclusively for commercial purposes to transfer bulk quantities of fluids from one point (i.e. a tanker truck) to another (i.e. an underground storage tank). Any delay or disruption of such a fluid transfer operation, as may be caused by an inoperable hose, can have serious financial consequences. For another, although a fluid transfer hose itself is typically quite robust, its end fittings are not always so structurally sound. Instead, the end fittings of a fluid transfer hose may be relatively fragile and are generally more easily damaged than is the hose. Finally, when an end fitting becomes damaged and is no longer operationally useful, it is typically necessary to replace the entire fluid transport hose. This can be expensive.

From a practical perspective, a fluid transport hose needs to be protected from incidental damages whenever it is not being operationally used. In particular, this protection is mostly required during the set-up and break-down of a fluid transfer operation. Specifically, it is during these times (i.e. when the hose is being removed/returned to a storage compartment, or moved into its intended operational configuration) that the end fittings of the hose are particularly susceptible to damage by unintended, externally applied forces.

Heretofore, end caps for fluid transport hoses have been designed and provided primarily for the purpose of covering the end fittings so foreign particles (e.g. dirt, dust and debris) can not get into the hose when it is not being used. In addition, fluid transport hoses have not accounted for residual liquids left in a hose when it is removed after being utilized for performing a task. By not accounting for residual liquids, such liquids can easily spill as hoses are being maneuvered. Also, water, rain, or snow could mix with the residual liquid and allow the residual liquid to leak or spill onto the ground. As another operational consideration, an ability to grasp the cap or end fitting for the purpose of moving the hose during set-up and break-down has been of lesser, if any, concern. In addition, other fittings require the removal of gloves to be able to properly manipulate the small rings found on most hoses. Nevertheless, it is readily apparent that despite the fact fluid transport hoses are typically quite big and bulky they must be effectively manipulated, as well as being protected.

For the reasons set forth above, an object of the present invention is to provide a system for protecting the end fittings of a fluid transport hose that effectively protects the end fittings of the hose during its operational use. Another object of the present invention is to provide protective caps for the end fittings of a fluid transport hose that provide handles which allow the hose to be effectively manipulated during its operational use. Still another object of the present invention is to provide protective caps for a fluid transport hose that can be configured for use with different types of end fittings on the hose. Yet another object of the present invention is to provide a system using protective caps for the end fittings of a fluid transport tube that is simple to use, is easy to manufacture and is comparatively cost effective.

SUMMARY OF THE INVENTION

In accordance with the present invention, a system is provided for protecting the end fittings of a fluid transport hose from damage by unwanted or unintended impact forces on the end of the hose. Essentially, the system includes two protective caps (plugs) that differ from each other according to the type of end fitting they will protect. In common with each other, the caps each include a substantially flat circular disk having a disk diameter ($D_D$). Importantly, the disk diameter $D_D$ is greater than the diameter ($D_H$) of the fluid transport hose. Further, each cap (plug) includes a means that is mounted on the disk to engage the disk with an end fitting on the hose. With this engagement, the disk covers the end of the hose and is oriented substantially perpendicular to the axis of the hose. Importantly, the disk extends radially outward beyond the end fitting. Thus, because the disk is dimensionally more prominent than the end fitting, the end fitting is protected from impact forces that will strike the disk of the cap rather than striking the fitting at the end of the hose.

As mentioned above, each protective cap of the present invention will have a particular configuration that conforms with the type of end fitting to which it will be engaged. For example, an end fitting on the hose may require a cam and groove coupling that includes articulating arms for moving cam lobes formed on the respective arms. In this case, the cap will include a cylindrical shaped insertion body that is affixed to a first side of the disk. Dimensionally, the insertion body will have a body diameter ($D_B$) that is less than either the diameter of the hose or the diameter of the disk (e.g. $D_B < D_H < D_D$). Further, the insertion body will have a groove for receiving the cam lobes on the articulating arms into the groove of the insertion body to hold the cap on the fitting. On the other hand, where the end fitting on the hose is formed with a groove, the cap will include a hollow cylindrical shaped housing that is affixed to the first side of the disk. In this case, a pair of diametrically opposed articulating arms are mounted on the housing, with each articulating arm being selectively moved to an engagement position. As an articulating arm is moved into its engagement position, the cam lobe on the articulating arm is moved into the groove of the fitting to hold the cap on the fitting. In addition, when one of the arms is opened, the cap will shift and allow for the release of pressure that may accumulate due to increased heat or changes in elevation. For both type caps, a handle is affixed to the second side of the disk, opposite the first side.

For the present invention it is envisioned that a protective cap will be made of a structurally strong material. Further, it is envisioned the material will have a characteristic that is particularly suited for the environment in which it will be operationally used. For example, a medical grade plastic can be used when the fluid transport tube conveys potable fluids. Alternatively, a composite material including an anti-static additive can be employed when flammable fluids are involved. And, an industrial grade plastic can be used with toxic and non-toxic fluids. In addition, a composite can be designed to withstand temperature extremes or to be resistant to any chemical or combination of chemicals.

In an alternate embodiment of the present invention, the disk of each protective cap can be formed with a depression. When the cap includes a handle that is affixed to the disk, the handle will preferably be positioned on the disk to straddle the depression and thereby establish a space between the handle and disk large enough for manipulation by a gloved hand. The purpose here is to facilitate manipulation of the cap and, ultimately, to facilitate the operational handling of the fluid transport hose. In other embodiments of the present invention, the handle of a cap can be formed to provide for a snap-on engagement of the handle with the disk to allow the fitting to accommodate the gloved hand of an operator. In another embodiment, the handle can be pivotally attached to the disk, screwed to the disk, welded to the disk, or molded to the disk. Further, although this disclosure mainly discusses cam and groove couplings, it is to be appreciated that screw couplings and other type couplings well known in the pertinent art are envisioned for use with the present invention.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
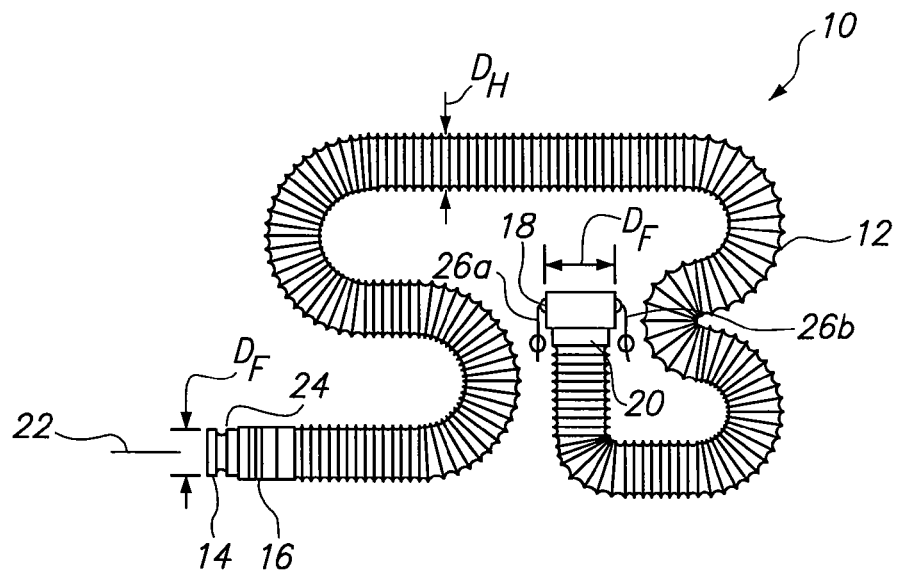
FIG. 1 is a plan view of a fluid transport hose for use with the system of the present invention.

Referring initially to FIG. 1, a fluid transport hose for use with the present invention is shown and is generally designated 10. As shown, the hose 10 includes a hose body 12 having a fitting 14 at an end 16 of the hose body 12, and a fitting 18 at an end 20 of the hose body 12. Preferably, the hose body 12 is flexible and, with respect to each of the ends 16 and 20, the hose body 12 will define an axis 22 that is used herein for reference purposes. By way of example, FIG. 1 also shows that the fitting 14 is formed with a groove 24 and that the fitting 18 includes diametrically opposed articulating arms 26a and 26b. For purposes of disclosing the hose 10 in combination with protective caps (plugs) 28 and 30, it is established that the hose body 12 has a diameter $D_H$ and that the fittings 14 and 18 will have a variable diameter identified as $D_F$.

Figure 2:
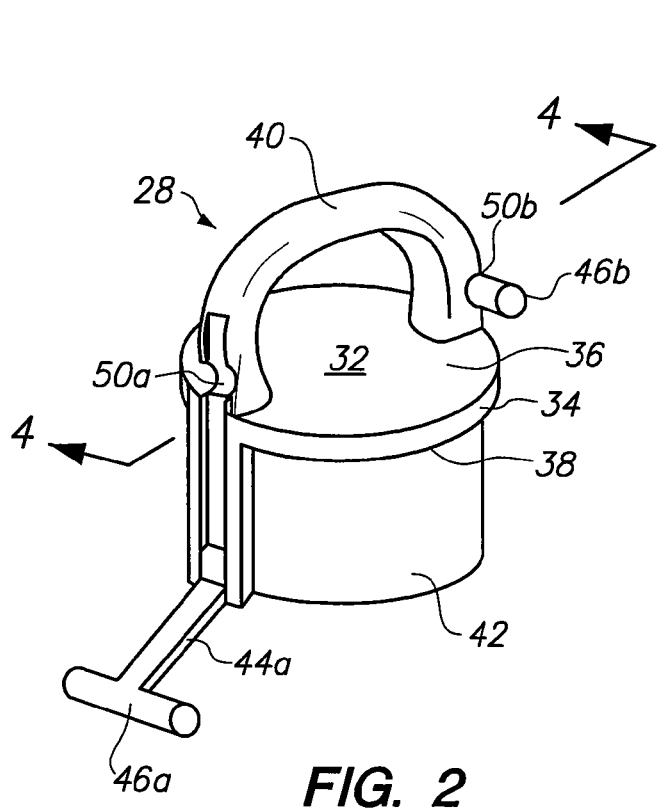
FIG. 2 is a perspective view of a protective cap with articulating cam engagement arms in accordance with the present invention.
Figure 3:
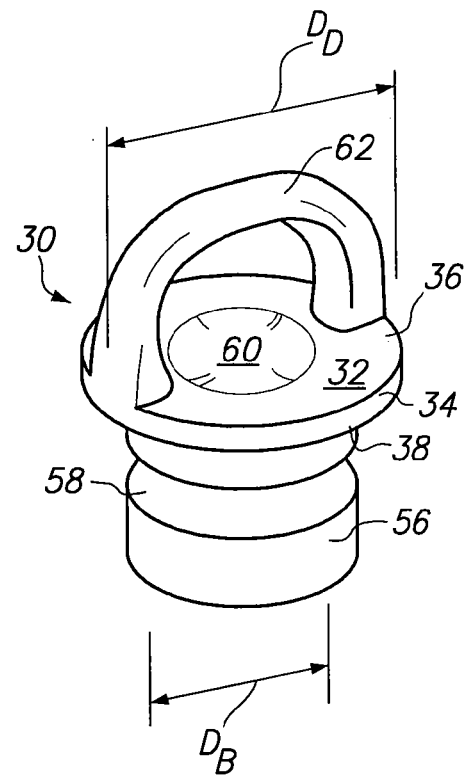
FIG. 3 is a perspective view of a protective cap having an engagement groove in accordance with the present invention.

FIG. 2 shows one type of a protective cap (plug) 28 for use by the present invention, and FIG. 3 shows another type of protective cap 30 for use by the present invention. Specifically, both caps 28/30 will be used on a same hose 10, and the type of protective cap 28/30 will depend on the particular type of fitting 14/18 to which it will be engaged. For the structures shown in FIGS. 1, 2 and 3, the protective cap 28 shown in FIG. 2 will engage with the fitting 14 at the end 16 of hose body 12 shown in FIG. 1. Likewise, the protective cap 30 shown in FIG. 3 will engage with the fitting 18 (FIG. 1) at the end 20 of hose body 12. It is to be appreciated, however, that the particular fittings 14/18, and the particular protective caps 28/30 disclosed here in detail are only exemplary. As envisioned for the present invention, various other types of end fittings can be used for a fluid transport hose 10. Consequently, corresponding variations in the types of protective caps can be used that will conform with the particular fittings being used. Examples of the types of fittings that are suitable for use with the present invention include: victaulic, firehose thread, acme thread, Chicago, national pipe thread, and propane.

With reference to FIG. 2, it will be seen that the protective cap 28 includes a disk 32. More specifically, the disk 32 is substantially flat, and it is substantially circular shaped to establish a skirt (bump) 34 at its periphery. With this structure, the disk 32 also has a top side 36 and a bottom side 38. Like protective cap 28, the protective cap 30 shown in FIG. 3 also includes a disk 32 with a skirt (bump) 34. It also has a top side 36 and a bottom side 38. Further, as indicated in FIG. 3, but applicable to both caps 28/30, the respective disk 32 of the caps 28/30 each has a diameter $D_D$.

Figure 4:
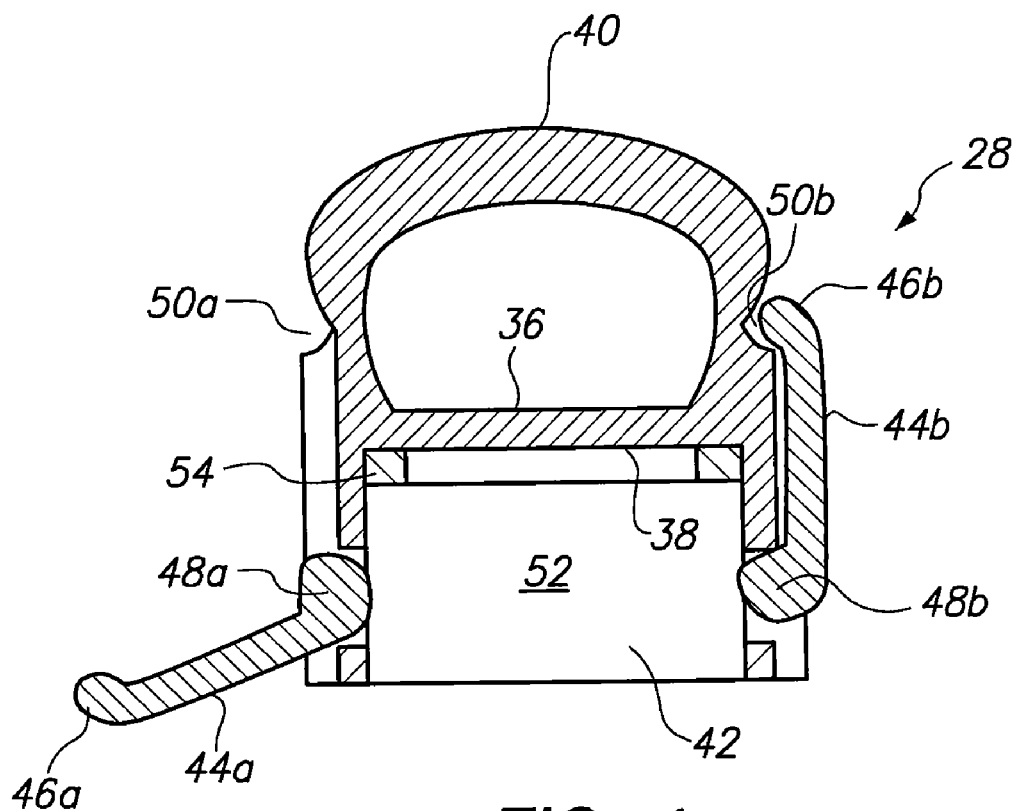
FIG. 4 is a cross-section view of the protective cap shown in FIG. 2 as seen along the line 4-4 in FIG. 2.

Still referring to FIG. 2 it will be seen that the cap 28 includes a handle 40 that extends from the top side 36 of disk 32. It is also shown that the cap 28 includes a housing 42 that extends from the bottom side 38 of the disk 32. Further, with cross reference between FIG. 2 and FIG. 4 is can be seen that cap 28 includes a pair of diametrically opposed articulating arms 44a and 44b having respective grips 46a and 46b. Further, the articulating arms 44a and 44b are each formed with a respective cam lobe 48a and 48b. This cross reference also indicates that the grips 46a and 46b can be respectively engaged with recesses 50a and 50b that are formed on handle 40 (e.g. see articulating arm 44b in FIG. 4). Also, FIG. 4 shows that the housing 42 of protective cap 28 creates a hollow chamber 52, and that a washer (gasket) 54 can be positioned in the housing 42 against the bottom side 38 of disk 32.

In detail, FIG. 3 shows that the protective cap 30 is formed with a substantially cylindrical shaped insertion body 56 that extends from the bottom side 38 of the disk 32. FIG. 3 also shows that the insertion body 56 is formed with a circumferential groove 58, and that the insertion body 56 has a diameter DB. For an alternate embodiment of the protective cap 30, FIG. 3 shows that the top side 36 of disk 32 can be formed with a depression 60. The purpose here is to provide more space between the top side 36 and the handle 62 to facilitate manipulation of the hose 10 when the protective cap 30 is engaged with the hose 10. Though not shown, a similar type depression can be provided for the same purpose on the top side 36 of protective cap 28.

Figure 5:
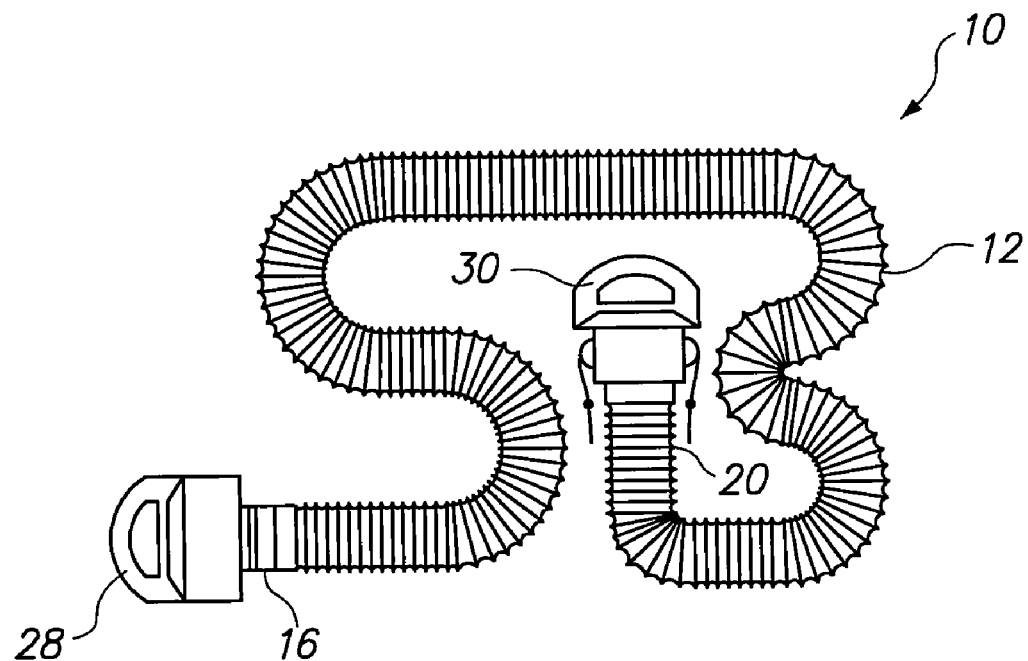
FIG. 5 is a plan view of a fluid transport hose showing a protective cap engaged with each end fitting of the fluid transport hose.

As shown in FIG. 5, when in use, the protective caps 28 and 30 are respectively engaged with the ends 16 and 20 of the hose body 12. More specifically, an engagement of the protective cap 28 with the fitting 14 is accomplished by inserting the fitting 14 into the chamber 52 of housing 42. This insertion is accomplished while the articulating arms 44a and 44b of the protective cap 28 are both positioned as shown for the articulating arm 44a in FIGS. 2 and 4. Once the fitting 14 has been inserted, the articulating arms 44a and 44b are then moved to respective engagement positions wherein both of the articulating arms 44a and 44b are positioned as shown for the articulating arm 44b in FIG. 4. Also, when the articulating arms 44a and 44b are in their engagement positions, the grips 46a and 46b on respective arms 44a and 44b will be securely seated into the recesses 50a and 50b on handle 40. Consequently, as best seen in FIG. 4, when the articulating arms 44a and 44b are in their engagement positions, the respective cam lobes 48a and 48b are also moved into the groove 24 of the fitting 14 to hold the protective cap 28 on the fitting 14. Similarly, an engagement of the protective cap 30 with the fitting 18 is accomplished by inserting the insertion body 56 of cap 30 into the fitting 18. The articulating arms 26a and 26b of the fitting 18 can then be manipulated to position cam lobes (not shown) into the groove 66 of the cap 30 to hold cap 30 on the fitting 18. The protective caps 28/30 can then be selectively removed from the respective fittings 14/18 for a subsequent use of the hose 10 by simply reversing the process.

Figure 6A:
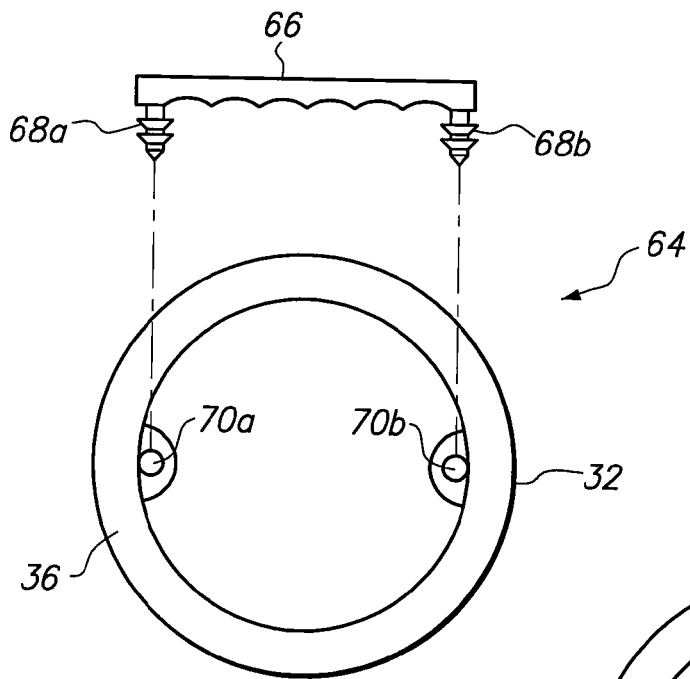
FIG. 6A is an exploded view showing an alternate embodiment of a protective cap with a handle.
Figure 6B:
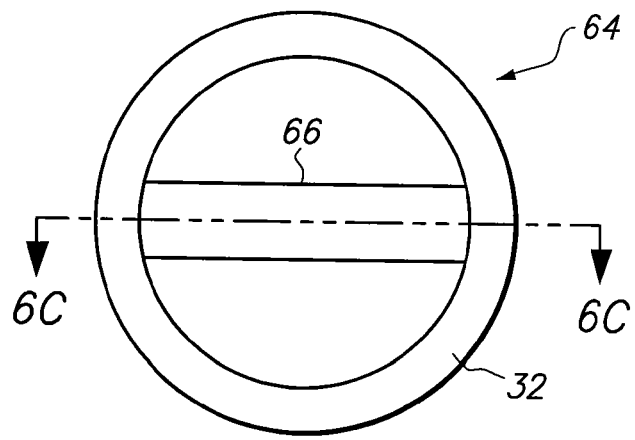
FIG. 6B is a top view of the protective cap shown in FIG. 6A showing the handle connected to the top of the disk.
Figure 6C:
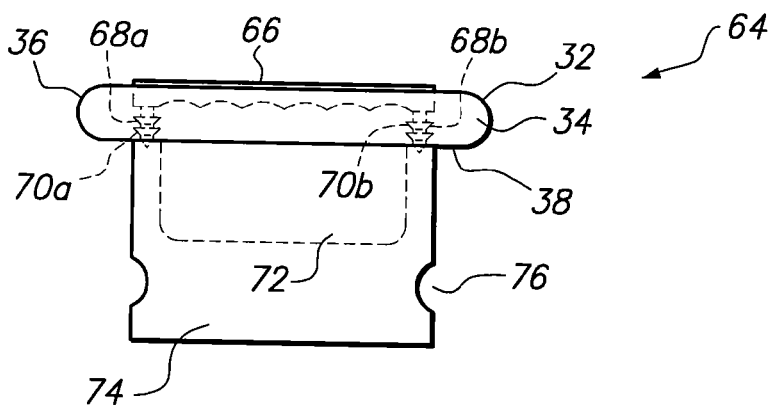
FIG. 6C is a cross-section view of the protective cap shown in FIG. 6B along the line 6C-6C in FIG. 6B.

Referring next to FIG. 6A, FIG. 6B, and FIG. 6C, an alternate embodiment of the protective cap 64 is shown. First referring to FIG. 6A, a handle 66 is formed having two inserts 68a-b. In order to attach the handle 66 to the disk 32, two holes 70a-b are formed on the top side 36 of the disk 32 to receive the two inserts 68a-b. Furthermore, the two holes 70a-b may be attached to the top side 36 of the disk 32 in various ways to include bonding, snapping, molding, or gluing. In FIG. 6B, the protective cap 64 is shown with the handle 66 attached to the disk 32 as viewed from above. When viewed in FIG. 6C, the handle 66 is shown with the inserts 68a-b fully engaged with the holes 70a-b. As shown, the holes 70a-b extend from the top side 36 of the disk 32 through the skirt 34 and through the bottom side 38 of the disk 32. Furthermore, the cap 64 also comprises an insertion body 74 with a groove 76. Importantly, FIG. 6C illustrates how the handle 66 is substantially flush with the top side 36 of the disk 32 and a cavity 72 is formed on the insertion body 74 to allow sufficient space for manipulation of the handle 66 by a gloved hand. As a result of the handle 66 being substantially flush with the top side 36 of the disk 32, no additional length is added to a hose when engaged with the protective cap 64.

Figure 7A:
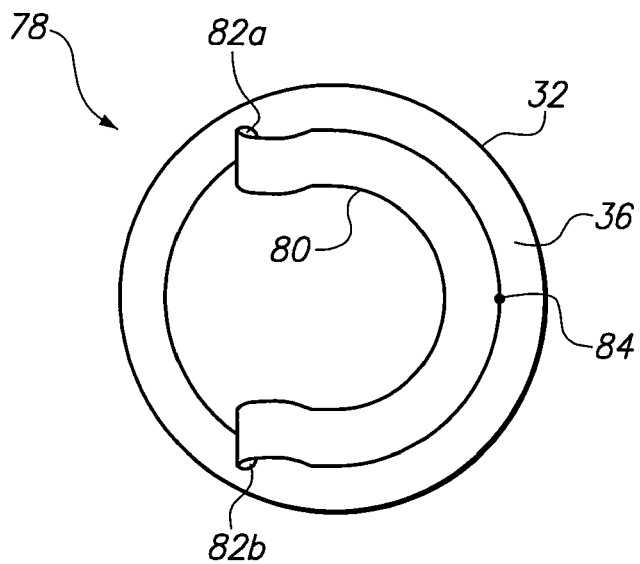
FIG. 7A is a top view of an alternate embodiment of a protective cap with a movable handle connected to the top of the disk.
Figure 7B:
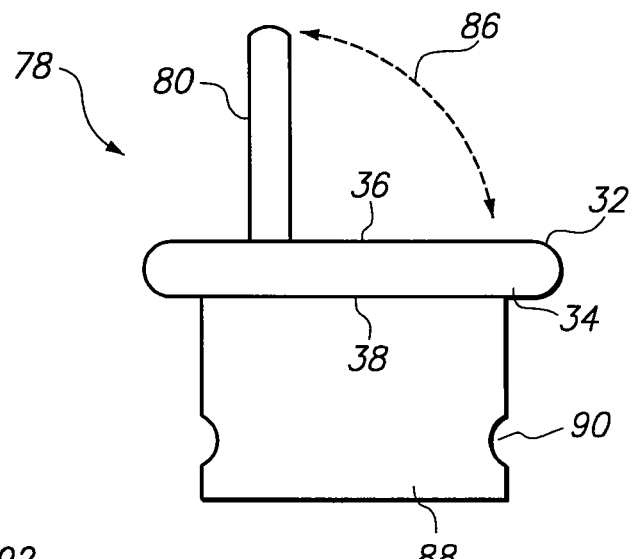
FIG. 7B is a side view of the protective cap shown in FIG. 7A with the handle in an elevated position.
Figure 7C:
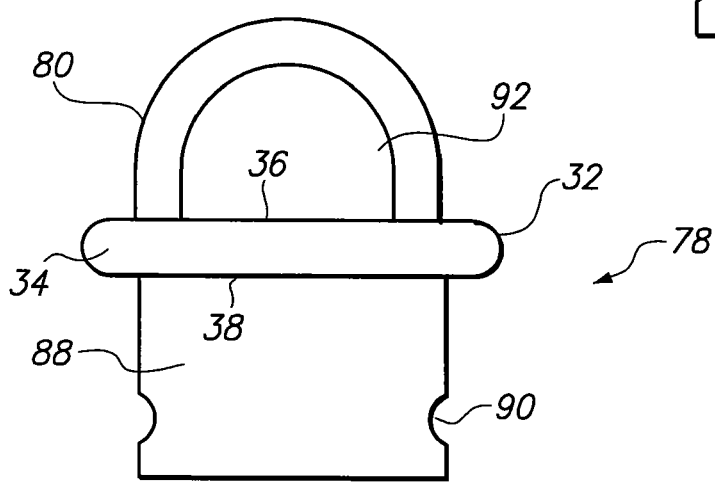
FIG. 7C is an alternate side view of the protective cap shown in FIG. 7B with the handle in the elevated position showing a cavity formed by the handle and the top of the disk.

Next, referring to FIG. 7A, FIG. 7B, and FIG. 7C, another embodiment of a protective cap 78 is shown. In this embodiment, a handle 80 is connected to the top side 36 of the disk 32 at two pivot points 82a-b. Additionally, a detent 84 connected to the top side 36 of the disk 32 is provided to keep the handle 80 in a first position where it is substantially flush with the top side 36 of the disk 32. As in the previous embodiment, because the handle 80 is substantially flush with the top side 36 of the disk 32, no additional length is added to a hose when engaged with the protective cap 78. As shown in FIG. 7B, the handle 80 can be moved between the first position and a second position as indicated by the dashed directional arrow 86. In the second position, the handle 80 is substantially upright and perpendicular to the disk 32. In addition, the bottom side 38 of the disk 32 is connected to an insertion body 88 which is substantially cylindrical in shape and contains a groove 90 as depicted in FIG. 7B and FIG. 7C. As shown in FIG. 7C, when in the second position, the handle 80 forms a cavity 92 between the handle 80 and the top side 36 of the disk 32 to allow for the maneuvering of the protective cap 78.

Figure 8:
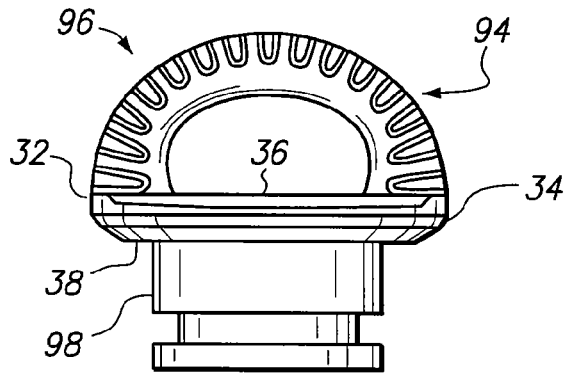
FIG. 8 is a side view of the protective cap with a victaulic groove (military) connector.
Figure 9:
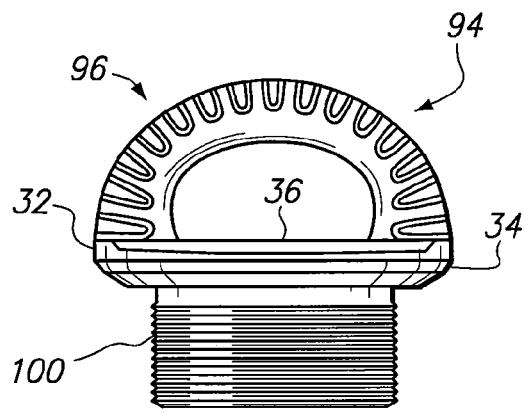
FIG. 9 is a side view of the protective cap with a thread connector.
Figure 10:
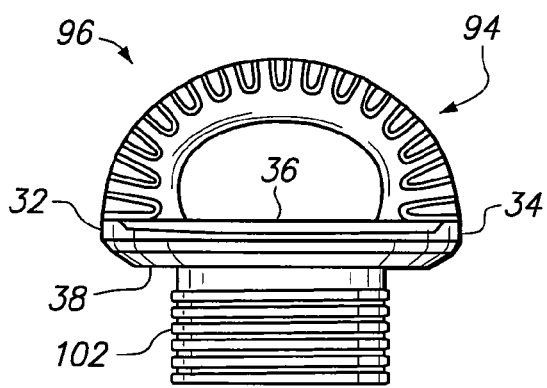
FIG. 10 is a side view of the protective cap with a drill bit thread connector.
Figure 11:
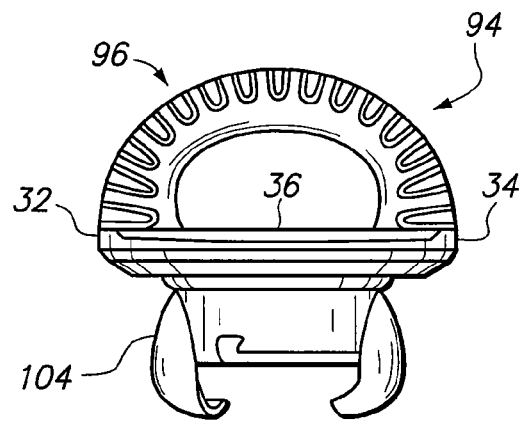
FIG. 11 is a side view of the protective cap with a TW (Tank Wagon) connector.

Now referring to FIGS. 8, 9, 10 and 11, a protective cap 94 is shown having a handle 96 and, sequentially, a series of different connectors. As shown, the handle 96 is affixed to the top side 36 of the disk 32. In FIG. 8, the connector of the protective cap 94 is a victaulic groove (military) connector 98. In FIG. 9, the protective cap has a thread connector 100. In FIG. 10, the protective cap 94 has a drill bit thread connector. In FIG. 11, the connector 104 is a TW (Tank Wagon) connector.

While the particular Safety Cap for Couplings and Fittings as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A cap for protecting a fitting at an end of a fluid transport hose from damage by impact forces on the end of the hose, wherein the hose has a diameter ($D_H$) and defines an axis, and the cap comprises:
   a substantially flat circular disk having a first side, a second side opposite the first side, and a disk diameter ($D_D$), wherein $D_D$ is greater than $D_H$;
   a means extending from the first side of the disk for engaging the disk with the fitting on the hose, to orient the disk substantially perpendicular to the hose axis, with the disk extending radially beyond the fitting to protect the fitting from impact forces at the end of the hose; and
   a handle extending from the second side of the disk.

2. A cap as recited in claim 1 wherein the fitting on the hose includes an articulating arm and the engaging means comprises:
   a cylindrical shaped insertion body extending from the first side of the disk, wherein the insertion body has a body diameter ($D_B$) with $D_B < D_H < D_D$ and further wherein the insertion body is formed with a groove for receiving therein a cam lobe formed on the articulating arm of the fitting to hold the cap on the fitting.

3. A cap as recited in claim 1 wherein the fitting on the hose is formed with a groove and the engaging means comprises:
   a hollow cylindrical shaped housing extending from the first side of the disk; and a pair of diametrically opposed articulating arms mounted on the housing, with each articulating arm being selectively moved to an engagement position to engage a cam lobe on the articulating arm with the groove of the fitting to hold the cap on the fitting.

4. A cap as recited in claim 3 wherein the handle is formed with a pair of diametrically opposed recesses and each articulating arm is formed with a grip, wherein the grip of each articulating arm is received in a respective recess on the handle to fixedly hold the cap on the fitting when the articulating arm is in the engagement position.

5. A cap as recited in claim 1 wherein the fitting on the hose is formed with a first screw thread, and the engaging means comprises:
   a cylindrical shaped body extending from the first side of the disk, wherein the body has a body diameter ($D_B$) with $D_B < D_H < D_D$ and further wherein the body is formed with a second screw thread for engaging with the first screw thread on the cap to hold the cap on the fitting.

6. A cap as recited in claim 1 wherein the cap is made of a material having a characteristic selected from a group consisting of a medical grade plastic for use with potable fluids, a composite material including an anti-static additive for use with flammable fluids, and an industrial grade plastic for use with toxic and non-toxic fluids.

7. A cap as recited in claim 1 wherein the second side of the disk is formed with a depression, and wherein the handle extends from the second side of the disk so as to straddle the depression and establish a space between the handle and the second side of the disk to facilitate manipulation of the cap.

8. A cap as recited in claim 1 wherein the handle is detachably connected to the second side of the disk.

9. A cap as recited in claim 1 wherein the handle is pivotally attached to the second side of the disk.

10. A device for protecting an end of a fluid transport hose which comprises:
    a hollow, substantially cylindrical shaped fitting mounted on the end of the hose, wherein the hose has a diameter ($D_H$) and defines an axis, and wherein the fitting extends radially outward from the axis through a distance ($D_F$) from the axis; and
    a cap selectively engaged with the fitting, wherein the cap comprises:
        a disk having a first side, a second side opposite the first side, and a disk diameter ($D_D$), wherein the disk is oriented substantially perpendicular to the axis, and further wherein $D_D > D_H$ and $D_D > D_F$ to protect the fitting from damage caused by unintended impact forces; and
        a handle extending from the second side of the disk.

11. A device as recited in claim 10 wherein the fitting on the hose includes an articulating arm and wherein the cap further comprises:
    a cylindrical shaped insertion body extending from the first side of the disk, wherein the insertion body has a body diameter ($D_B$) with $D_B < D_H < D_D$ and further wherein the insertion body is formed with a groove for receiving therein a cam lobe formed on the articulating arm of the fitting to hold the cap on the fitting.

12. A device as recited in claim 10 wherein the fitting on the hose is formed with a groove and where the cap further comprises:
    a hollow cylindrical shaped housing extending from the first side of the disk;
    a pair of diametrically opposed articulating arms mounted on the housing, with each articulating arm being selectively moved to an engagement position to engage a cam lobe on the articulating arm with the groove of the fitting to hold the cap on the fitting.

13. A device as recited in claim 10 wherein the fitting on the hose is formed with a first screw thread, and wherein the cap further comprises:
    a cylindrical shaped body extending from the first side of the disk, wherein the body has a body diameter ($D_B$) with $D_B < D_H < D_D$ and further wherein the body is formed with a second screw thread for engaging with the first screw thread on the cap to hold the cap on the fitting.

14. A device as recited in claim 10 wherein the cap is made of a material having a characteristic selected from a group consisting of a medical grade plastic for use with potable fluids, a composite material including an anti-static additive for use with flammable fluids, and an industrial grade plastic for use with toxic and non-toxic fluids.

15. A device as recited in claim 10 wherein the second side of the disk is formed with a depression, and wherein the handle extends from the second side of the disk so as to straddle the depression and establish a space between the handle and the second side of the disk to facilitate manipulation of the cap.

16. A method for protecting fittings of a fluid transport hose from damage by impact forces on the ends of the hose, the hose having a first fitting at a first end thereof and a second fitting at a second end thereof, wherein the hose has a diameter ($D_H$) and defines an axis, and the method comprises the steps of:
    providing a first cap, wherein the first cap comprises:
        a substantially flat circular disk having a first side, a second side opposite the first side, and a disk diameter ($D_D$), wherein $D_D$ is greater than $D_H$;
        a means extending from the first side of the disk of the first cap for engaging the first cap with the first fitting on the hose; and
        a handle extending from the second side of the disk of the first cap;
    providing a second cap, wherein the second cap comprises:
        a substantially flat circular disk having a first side, a second side opposite the first side, and the same disk diameter ($D_D$) as the first cap;
        a means extending from the first side of the disk of the second cap for engaging the second cap with the second fitting on the hose; and
        a handle extending from the second side of the disk of the second cap;
    engaging the first cap with the first end of the hose, to orient the disk of the first cap substantially perpendicular to the hose axis, with the disk of the first cap extending radially beyond the first fitting to protect the first fitting from impact forces at the first end of the hose; and
    engaging the second cap with the second end of the hose, to orient the disk of the second cap substantially perpendicular to the hose axis, with the disk of the second cap extending radially beyond the second fitting to protect the second fitting from impact forces at the second end of the hose.

17. A method as recited in claim 16 wherein the first fitting on the hose includes an an articulating arm and the first engaging means of the first cap comprises:
    a cylindrical shaped insertion body extending from the first side of the disk, wherein the insertion body has a body diameter ($D_B$) with $D_B < D_H < D_D$ and further wherein the insertion body is formed with a groove for receiving therein a cam lobe formed on the articulating arm of the fitting to hold the cap on the fitting.

18. A method as recited in claim 16 wherein the fitting on the hose is formed with a groove and the engaging means of the second cap comprises:
- a hollow cylindrical shaped housing extending from the first side of the disk; and
- a pair of diametrically opposed articulating arms mounted on the housing, with each articulating arm being selectively moved to an engagement position to engage a cam lobe on the articulating arm with the groove of the fitting to hold the cap on the fitting.

19. A method as recited in claim 16 wherein the first cap and the second cap are made of a material having a characteristic selected from a group consisting of a medical grade plastic for use with potable fluids, a composite material including an anti-static additive for use with flammable fluids, and an industrial grade plastic for use with toxic and non-toxic fluids.

20. A method as recited in claim 16 wherein the second side of the disk of the first cap and the second side of the disk of the second cap are formed with a depression, and wherein the handle of the first cap extends from the second side of the disk of the first cap and the handle of the second cap extends from the second side of the disk of the second cap so as to straddle each depression and establish a space between the handle and the second side of each disk to facilitate manipulation of each cap.

\* \* \* \* \*